INVENTOR
K. B. McAFEE, JR.
BY
H. O. Wright
ATTORNEY

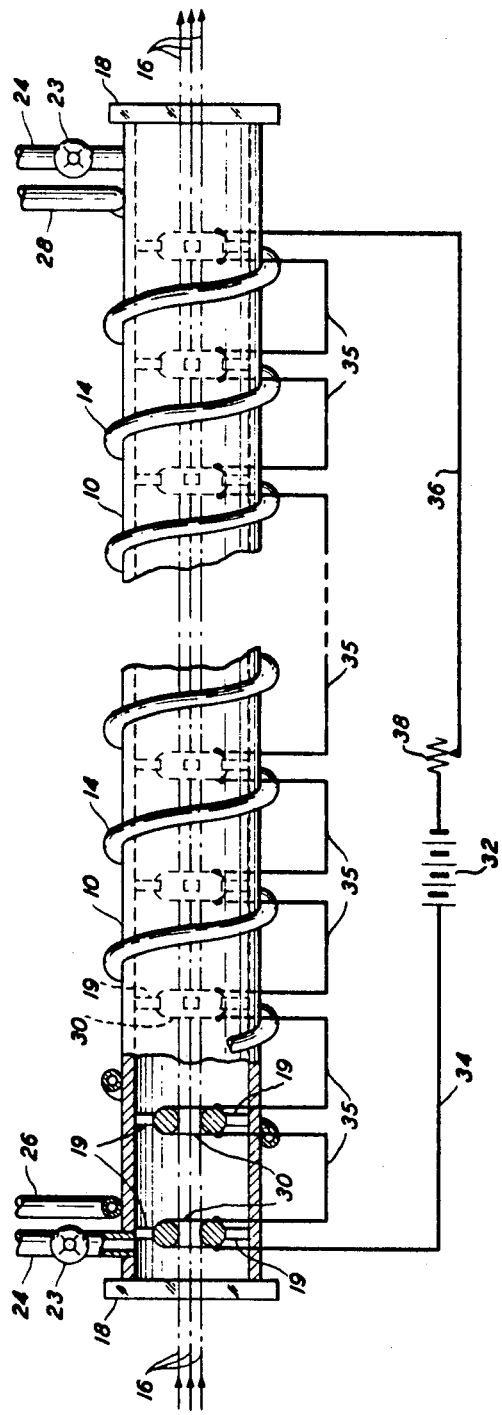

United States Patent Office 3,390,932
Patented July 2, 1968

3,390,932
THERMAL DIFFUSION GAS LENS EMPLOYING GAS MIXTURES
Kenneth B. McAfee, Jr., Summit, N.J., assignor to Bell Telephone Laboratories, Incorporated, New York, N.Y., a corporation of New York
Filed Apr. 6, 1964, Ser. No. 357,424
3 Claims. (Cl. 350—96)

ABSTRACT OF THE DISCLOSURE

This application describes a waveguiding structure for electromagnetic wave energy and, in particular, for light beams. It is known that by establishing a radially decreasing temperature gradient in a transparent gas, rays, which tend to diverge away from the beam axis, are refracted back towards the axis in much the same way as they would be by a thin converging lens. In accordance with the present invention, the focusing action of a thermal gaseous waveguide in enhanced by using a mixture of a light gas and a heavy gas instead of a single gas. This comes about because of the tendency of the lighter gas, which typically has a smaller refractive index, to concentrate towards the hotter end of the thermal gradient while the heavier gas, which has the larger refractive index, concentrates at the cooler end. Various gas combinations are disclosed.

---

Figure 1:
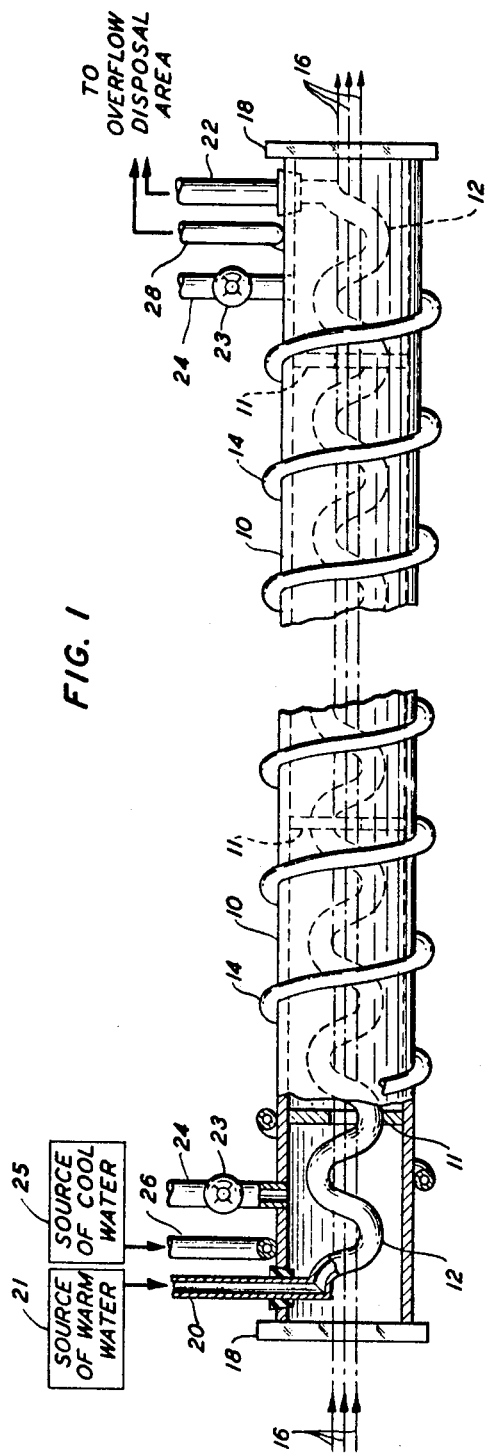

This invention relates to the long distance transmission of electromagnetic waves. More particularly, it relates to the long distance transmission of beams of ultrahigh frequency wave energy, including visible light and adjacent energy bands, and to the prevention of scattering of the rays of such beams during transmission.

Many arrangements for generating and utilizing extremely narrow, intense and highly directive beams of substantially coherent, very high frequency, electromagnetic wave energy, principally in the visible light and adjacent energy bands, embracing wavelengths between the approximate limits of 1,000 Angstroms and two million Angstroms, inclusive, have been devised during the last several years. Numerous and varied devices for generating such wave energy beams, usually designated "lasers," have been and are being invented and developed with astonishing proliferation.

In view of the extremely high frequencies of such waves and the wide frequency range over which they are operative, the above developments give promise of the practicability of utilizing vastly extended ranges of frequency for systems of extremely large capabilities for the transmission of intelligence such as speech, video, and data transmission signals and the like.

Notwithstanding the fact that lasers devised during the last few years are capable of producing extremely narrow, highly directive, substantially coherent energy beams, transmission of even these beams over substantial distances is accompanied by a very appreciable spreading of the beam, resulting in a large diminution of the energy received, usually referred to as attenuation, at a distant point on the axis of the beam, Beam spreading also involves the possibility that a significant portion of the energy beam may be intercepted by other stations as well as by the intended receiving station.

Furthermore, in many instances it is desired that the laser beam be transmitted through an enclosing pipe or conduit, of a material impervious to gas. A gas or mixture of gases can then be employed to fill the conduit thus providing a medium of controllable uniform and stable characteristics, so that the transmission can be rendered free from unfavorable effects such as those resulting from changing atmospheric conditions such as rain, snow, sleet, fog, temperature effects and the like. Such a system, obviously, would, if the pipe or conduit is also opaque to light, eliminate all possibility of interception of portions of the beam by unauthorized receiving stations, thus assuring the preservation of complete privacy of communication.

The above-mentioned spreading of the beam when an enclosing conduit (which must necessarily have transverse cross-sectional dimensions much larger than the wavelength of the light or similar energy to be transmitted) is employed obviously may result, for a long distance system (several hundred miles long, for example), in the multiple reflection of the spreading rays by the conduit walls, destroying the coherency of the beam and producing serious attenuation and distortion of the transmitted signals. Thus it is apparent that the use of means for substantially eliminating beam spreading is important even when an enclosing conduit is employed.

The present invention represents an improvement over the invention of D. W. Berreman, Ser. No. 347,166, filed Feb. 25, 1964, assigned to applicant's assignee which proposed to reduce significantly the above described deleterious effects of beam spreading by introducing throughout the length of the beam path a slight diversion of the outer rays of the beam toward the central axis of the path. The arrangements of the Berreman application mentioned above have become known in the art as "thermal gas lenses." In view of the relation between the arrangements of the present application and those of Berreman, the arrangements of the present invention will be referred to as "thermal diffusion gas lenses" throughout the present application including the claims. For a more detailed discussion of the operation of a thermal gas lens, see the above-identified application by Berreman.

The use of thin solid lenses of glass or the like distributed along the path for such a purpose has not proven very satisfactory both because of the substantial attenuation introduced by even the best of such lenses, in view of the large number of lenses required, and especially because of reflection effects at the surfaces of the lenses.

Accordingly, it is proposed in accordance with the teachings of the above-mentioned Berreman application to introduce moderate temperature gradients transversely to the path traversed by the energy beam, the gradients being distributed along the path and varied in their transverse angular directions in such manner that rays which tend to diverge from the axis of the beam are repeatedly deflected toward the axis in much the same way as they would be were a plurality of thin, long focal length, solid lenses introduced at appropriate intervals along the axis of the beam. The resultant collimating effect can then be proportioned to substantially eliminate the deleterious effects otherwise introduced by the tendency of the beam to spread.

The present invention further proposes in connection with the gas employed within the conduit of a "Berreman type" arrangement that in place of a single gas such as carbon dioxide or a fortuitous combination of gases such as the "clean air" suggested in the Berreman application, a mixture comprising the combination of a heavy gas and a light gas be employed. As is known, a lighter gas typically has a lower refractive index than a heavier gas. Thus, in view of the usual tendency of the lighter gas in a mixture with a heavier gas to become concentrated toward the hotter end of a thermal gradient, the use of such a mixture of gases containing an appreciable amount of the lighter gas in arrangements such as those of the Berreman application enhances the focusing tendencies and reduces aberrations. As a specific illustrative example, applicant has found that a mixture of substantially equal parts by volume of carbon dioxide and helium produces appreciably better focusing and less aberration than the single gas or fortuitous combination of gases proposed by Berreman.

The tendency of the components of a gas mixture to change their relative proportions along a thermal gradient is known as "thermal diffusion" and represents a phenomenon known to occur in all gaseous mixtures of appreciably differing densities so far investigated. In the majority of cases, including those of all known practicable combinations for the purposes of the present invention, the lighter gas, in a mixture with a heavier gas, tends to seek the higher temperature end of a section which is subject to a temperature gradient. While inversions of the effect have been observed in a few instances, the inversions have been taken place only at temperatures far removed from any practicable operating temperature for arrangements of the invention.

Accordingly, a principal object of the invention is to eliminate the difficulties resulting from beam spreading in beam transmission systems.

A further object is to control the focusing effect in thermal gas lenses.

Other and further objects, features and advantages of the application of the principles of the present invention will become apparent from a perusal of the following detailed description of illustrative embodiments of said principles and the appended claims taken in conjunction with the accompanying drawing, in which:

FIG. 1 illustrates in diagrammatic form a first structure in connection with which the principles of the present invention may be applied; and FIG. 2 illustrates in diagrammatic form a second structure in connection with which the principles of the present invention may be applied.

In more detail, in FIG. 1 a length of a pipe or conduit 10, which may, for example, extend between cities several hundreds of miles apart (the break near the center of the figure is intended to indicate a length too great to permit of realistic illustration), is of a material impervious to gas and a sufficiently good heat conductor that no sharp temperature gradients are established therein. Suitable materials are, for example, numerous plastics and metals including copper, aluminum, steel or the like. The conduit 10 is preferably employed to enclose the path 16 along which it is proposed to project a laser beam if, as mentioned above, the path of the beam would otherwise be subject to atmospheric changes such as rain, snow, sleet, fog, dust or the like. As it also mentioned above, if, furthermore, privacy is important, the material chosen for conduit 10 is preferably opaque to energy of the above-mentioned light and adjacent frequency bands. Conduit 10 may be of circular, square, oval, triangular, rectangular or other transverse cross-sectional shape so long as it serves to adequately enclose the helix 12 and path 16 along which the energy beam is to be transmitted. Normally it will be found convenient and in general preferable to employ corresponding transverse cross-sectional shapes for the conduit, the beam path, and the heating members.

A first helix 12 of tubing having a pitch (that is, a distance between similar points of successive turns of the helix) of, for example, approximately one inch and an input end 20 and an output end 22 is enclosed within conduit 10 and is coiled so as to surround the outer surface of the path 16 along which it is proposed to transmit the laser or similar beam. The transverse cross-sectional shape of path 16 may be circular, oval, square, or of other convenient form. The tubing of helix 12 may be of any of the materials mentioned above for the conduit 10. The pitch of the helix should be at least equal to the largest transverse cross-sectional dimension of the beam path as otherwise it may prove impracticable to maintain temperature gradients of significant magnitude across the path of the beam.

Supporting members 11 of low heat conductance placed at suitable intervals along conduit 10 hold helix 12 in proper alignment in conduit 10.

A suitable form for member 11 is illustrated in FIG. 1A of the above-mentioned Berreman application, assuming conduit 10 is of circular transverse cross section.

A second helix 14 which may also be of any of the above-mentioned materials has an input end 26 and an output end 28 and is coiled around the outer surface of conduit 10 in intimate contact with conduit 10.

For a system many miles in length, a plurality of helices 12 and 14 of convenient individual lengths placed end to end with their respective input and output ends brought out at convenient intermediate maintenance stations would, of course, prove more practicable. Appropriate arrangements of this character can of course readily be devised by mechanics skilled in the arts involved.

Thin plate glass barriers 18 of the highest grade optical glass are preferably provided at each end of conduit 10 and gas ports 24, equipped with valves 23, are provided near each end, and at such intermediate points as may be deemed advisable, the purpose of these features being to permit the maintenance of a substantially ideal atmosphere within conduit 10, as will become apparent as the description proceeds.

In operation, the inner helix 12 is heated, as by passing warm water or other convenient heating fluid through it from a source 21 to a temperature a few degrees (for example, eight degrees) centigrade higher than the "usual temperature" of conduit 10.

Similarly, the conduit 10 is maintained at its "usual temperature" by passing cool water or other convenient cooling fluid of suitable temperature and volume from a source 25 through the outer helix 14 to appropriately complement the other measures being taken to maintain the temperature difference it is desired to establish between helix 12 and conduit 10.

Output ends 22 and 28 of helices 12 and 14, respectively, should, of course, be connected to a suitable disposal area. Alternatively, the overflow may be recovered, appropriately reconditioned, and reused, one practicable arrangement, for example, being to reverse the flow through the respective helices periodically after appropriate quantities have been reconditioned at the respective outputs.

Alternatively, inner helix 12 can, obviously, be heated appropriately by passing electrical current through a suitable resistance wire (not shown) housed within helix 12 or substituted for helix 12.

In accordance with the principles of the present invention, as indicated above, the conduit 10 is filled with a mixture comprising a light gas and a heavy gas. A mixture of approximately equal parts by volume of the light and the heavy gases will be found satisfactory in most instances but any mixture including an appreciable percentage less than fifty percent of the lighter gas will produce an appreciable effect.

The gases should, of course, be transparent, stable and substantially chemically inert at any temperature at all likely to be encountered in operation. They should also be nontoxic to humans and preferably noninflammable.

A substantially ideal light gas for the purposes of this application is helium. Neon would be suitable but is probably too expensive for most practical purposes. Hydrogen would also produce good results but is objectionable as being highly inflammable. It is of course also possible to use other inert gases of moderate density as the "light" gas providing the heavier gas is appreciably more dense than the moderate density gas. Thus, those skilled in the art can readily devise numerous and varied mixtures of gases which can be appropriately employed in accordance with the principles of the present invention.

The heavy gas should, of course, be composed of molecules or atoms having large mass and large diameters. The suitable heavy gases are numerous and include carbon dioxide, nitrogen, argon, nitrogen dioxide, sulphur hexafluoride, carbonal sulphide, perfluorocyclobutane, chloropentafluoro ethane and many others too numerous to mention.

The maintenance of a controlled substantially ideal atmosphere within conduit 10 largely eliminates any necessity of readjusting the parameters of the system, such as, for example, the temperatures of helix 12 and conduit 10, to compensate for external atmospheric changes in pressure, temperature, humidity or possible contamination by smoke, dust or the like, as might be necessary were air from the surrounding atmosphere freely permitted to enter and fill the conduit.

As the mixture of gases adjacent points on the surface of inner helix 12 will be heated, its density and, hence, its refractive index will be decreased at such points, not only because of expansion resulting from being heated, but also because of the above-mentioned tendency of the lighter gas (of a mixture with a heavier gas) to become concentrated near the hotter end of a thermal gradient. Consequently, rays of the laser beam passing close to helix 12 will be deflected toward the axis of the laser beam. Convection currents established in the gas adjacent the helix are believed to enhance the focusing or deflecting effect of the over-all system and the concentration of the lighter gas at such points results in an increase in the extent and activity of such convection currents. With a mixture of approximately fifty percent helium and fifty percent carbon dioxide, by volume, for example, an increase in focusing effect of substantially twenty-five percent was obtained. Also, the relatively moderate spherical aberration encountered when substantially 100 percent carbon dioxide was employed was appreciably less with the above-mentioned mixture including helium. The over-all effect of the arrangement of FIG. 1 when appropriately proportioned and adjusted, as will be discussed at greater length hereinunder, is, therefore, to minimize the scattering of rays of the energy beam and to confine them to their intended path 16 through the center of the conduit.

The plate glass barriers 18, which should be as thin as practicable, in view of the pressure and normal stresses incident to use, and of the highest grade optical glass with surfaces accurately plane and parallel, are located at each end of conduit 10 and serve, as noted above, to confine within the conduit the particular mixture of gases selected for filling conduit 10. Turbulence of the gases should be kept to a minimum. For example, additional gases as may be required to maintain the selected operating pressure should be introduced slowly, moderate temperature differences between the helix 12 and conduit 10 should be employed, and major flushing operations if required should preferably be effected during periods when the system is not being used to transmit signals.

A gas port 24, having a valve 23, is provided at each end and at convenient intermediate points of a long system so that the conduit may be initially, and at such intervals as may be found advantageous, flushed to remove unwanted gases and the conduit may then be filled with the selected mixture of gases and maintained at a preselected pressure which, as mentioned above, is usually at least sufficiently above atmospheric pressure that leakage into the conduit is not probable. The use of a somewhat further increased pressure will have the effect of increasing the "lens" action or focusing strength. An increased temperature difference between the inner heating members and the conduit will also increase the focusing strength of the arrangements of the invention. Arrangements for flushing, filling, and maintaining pressure in gas filled conduits being well known and extensively used in the art are not shown or described in detail in this application.

In a number of cases the cooling helix 14 on the outer surface of the conduit 10 may not be required as, for example, where the conduit is immersed in a large body of water (that is, as for a submarine cable) or where the conduit is buried at a sufficient depth in the ground to be kept at a substantially constant temperature determined by the ground temperature. Alternatively, adequate cooling may in some instances be afforded by the surrounding atmosphere particularly if cooling fins (not shown) are provided on the exterior of the conduit. In rare instances, where ambient conditions are substantially conduit is buried at a sufficient depth in the ground use of conduit 10, entirely, as for example, in large structures having extensive ducts and passages which are only partially occupied by heating and power service lines and the like.

In other cases as, for example, where portions of the conduit may at times be exposed to intense direct sunlight or may pass closely adjacent to hot steam pipes or the like, it may be necessary to provide ample heat insulation over such exposed portions of the conduit assembly so that a substantially uniform conduit temperature over its entire length and periphery can be readily maintained.

Heat loss from the inner helix 12 to the conduit 10 can obviously be reduced by increasing the diameter of conduit 10 to provide greater separation from the helix 12.

The focusing effect of the arrangement of FIG. 1 will in general be approximately proportional to the length of tubing of helix 12 per unit length of conduit 10 and the temperature difference between helix 12 and conduit 10.

In FIG. 2 an arrangement is shown which is similar to that of FIG. 1, except that the inner helix 12 of FIG. 1 is omitted and spaced ring-shaped electrical heating units 30 are substituted. The units 30 are aligned along the longitudinal axis of conduit 10 and the central holes of the units 30 accommodate the passage of the laser or like energy beam along path 16. The holes in units 30 should, for best results, have transverse cross-sectional shapes substantially the same as the transverse cross-sectional shape of path 16 along which the energy beam is to be transmitted. The heating units 30 may be, for example, connected electrically in series as by electrical conductors 34, 35 and 36 and supplied by power from electrical energy source 32 through rheostat 38. Each unit 30 may be centrally maintained in conduit 10 by a plurality of small spacing elements 19 of a material having low heat conductivity.

Units 30 of FIG. 2 should be spaced along conduit 10 at intervals such that the sum of the circumferences of the rings substantially equals the length of tubing in the helix 12 of FIG. 1 for a comparable effect. The minimum spacing between units 30 should be substantially as described for the minimum pitch of the internal helix 12 of FIG. 1. The remaining features of the arrangements of FIG. 2 may be identical with the corresponding features of the arrangement of FIG. 1 as described in detail above in connection with FIG. 1 and as indicated by like designation numbers common to both figures. As for the system of FIG. 1, that of FIG. 2 may also be several hundreds of miles in length. Again, the break intermediate the ends of the system of FIG. 2 is intended to indicate a length too great to permit of realistic representation.

The use of a mixture of a light and a heavy gas as taught in the present application will also obviously be of advantage in curved portions of the conduit employing, for example, the general type of arrangement as illustrated in FIG. 3 of the above-mentioned Berreman application as described in detail in said application. It is further obvious that two substantially identical intertwined heating helices as illustrated in FIG. 4 of the above-mentioned Berreman application may be substituted for the single helix 12 of FIG. 1 of the present application. As taught by Berreman, such a double heating helix tends to eliminate a tendency toward spiraling of the beam rays reflected back toward the axis of the beam.

Numerous and varied modifications and rearrangements of the above described illustrative embodiments can readily be made by those skilled in the art without departing from the spirit and scope of the principles of the invention. Accordingly, it is to be understood that the specific structures described are illustrative but in no way restrictive of the scope of the invention.

What is claimed is:

1. A thermal diffusion gas lens type of waveguiding structure for guiding ultrahigh frequency wave energy comprising:

an elongated gas filled conduit;

heating means longitudinally distributed along said conduit for establishing a thermal gradient normal to the direction of wave propagation;

characterized in that said gas comprises a mixture of gases including a light transparent gas having a first refractive index and a heavier transparent gas having a second refractive index that is larger than said first refractive index.

2. The waveguide according to claim 1 wherein said gases are present in approximately equal quantities by volume.

3. The arrangement of claim 1 in which the light gas is helium and the heavy gas is selected from the group which consists of carbon dioxide, nitrogen, argon, nitrogen dioxide, sulphur hexafluoride, carbonal sulphide, perfluorocyclobutane, and chloropentafluoroethane.

References Cited

UNITED STATES PATENTS 3,067,420 12/1962 Jones et al. _____ 350—179 X
3,101,472 8/1963 Goubeau _____ 350—175

JOHN K. CORBIN, *Primary Examiner.*